(12) United States Patent
Forti

(10) Patent No.: US 7,682,145 B2
(45) Date of Patent: Mar. 23, 2010

(54) FORTUNE COOKIE MAKING TOOL

(75) Inventor: Eric Forti, Boynton Beach, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 656 days.

(21) Appl. No.: 11/653,029

(22) Filed: Jan. 12, 2007

(65) Prior Publication Data

US 2008/0171121 A1    Jul. 17, 2008

(51) Int. Cl.
*A23P 1/00* (2006.01)
*A47J 43/20* (2006.01)
*B28B 5/00* (2006.01)

(52) U.S. Cl. .................. 425/318; 425/403; 425/470; 425/394; 426/502

(58) Field of Classification Search .............. 425/318, 425/403, 383, 394, 470; 426/512, 502
See application file for complete search history.

(56) References Cited

U.S. PATENT DOCUMENTS

| | | | |
|---|---|---|---|
| 2,956,521 A | * | 10/1960 | Misch ..................... 425/318 |
| 3,265,016 A | | 8/1966 | Cheung |
| 3,605,642 A | | 9/1971 | Brown |
| 3,894,829 A | * | 7/1975 | Brunner et al. .......... 425/403.1 |
| 3,950,123 A | | 4/1976 | Louie |
| 3,983,262 A | | 9/1976 | Brunner |
| 4,339,993 A | | 7/1982 | Lee |
| 4,431,396 A | | 2/1984 | Lee |
| 4,591,328 A | | 5/1986 | Cheung |
| 4,797,291 A | | 1/1989 | Pierce |
| 4,929,458 A | | 5/1990 | Smietana |
| 5,417,996 A | | 5/1995 | Brink |
| 5,445,840 A | | 8/1995 | Wadell |
| 5,499,914 A | * | 3/1996 | Rist ........................ 425/470 |
| 6,355,288 B1 | | 3/2002 | DiGiacomo |

* cited by examiner

*Primary Examiner*—Maria Veronica D Ewald
(74) *Attorney, Agent, or Firm*—Lawrence J. Shurupoff

(57) ABSTRACT

A folding tool onto which one places a fortune cookie crepe and a fortune ticket, while the crepe is still soft and pliable, which one then bends at hinges of the tool in a specific sequence, to cause the folding of the crepe around the fortune ticket and into a traditional fortune cookie shape before the crepe begins to permanently harden into its thus-formed shape.

5 Claims, 2 Drawing Sheets

FORTUNE COOKIE MAKING TOOL

FIELD OF THE INVENTION

The present invention is a tool for use when hand-making Chinese fortune cookies, to ease the folding of the cookies and to ensure that the shape of the resulting cookies is consistent.

BACKGROUND OF THE INVENTION

Numerous machines exist which assist in the production of Chinese fortune cookies. Such machines are beneficial during high volume manufacture of cookies, as they ensure the quality and consistency of the folding and shaping of the cookies as they are produced in large quantities.

When made in lower quantities, such as when they are made at home, cookies may also be hand-folded, although this takes a combination of skill and experience, otherwise the quality of the resulting cookies will be inconsistent.

There exists the need for a simple and inexpensive tool to assist the inexperienced in making fortune cookies of a consistent quality in low qualities, such as in the home kitchen.

SUMMARY OF THE INVENTION

The present inventions is a tool for guiding the user to properly sequence and effect the folding of fortune cookies.

More specifically, the present invention is a folding tool onto which one places a fortune cookie crepe, while the crepe is still soft and pliable, and a fortune ticket, and which one then bends at hinges of the gig in a specific sequence, to cause the folding of the crepe around the fortune ticket before the crepe begins to permanently harden into its thus-formed traditional shape.

DETAILED DESCRIPTION OF THE PREFERRED EMBODIMENT OF THE INVENTION

The present invention is depicted in its preferred embodiment in FIGS. 1 through 5, where there is shown a tool 100 for aiding in the forming of a traditionally-shaped Chinese fortune cookie 180 from a still pliable cookie crepes 170.

Figure 1:
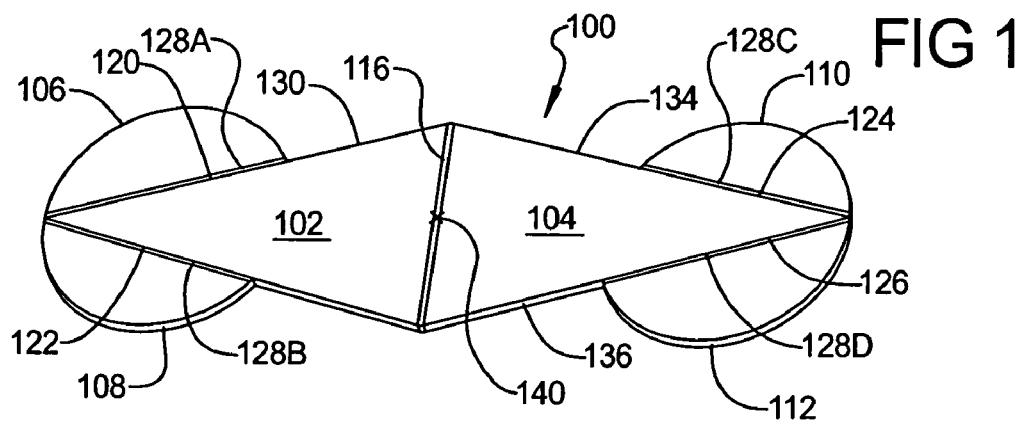
FIG. 1 is a perspective view of a fortune cookie making tool according to the preferred embodiment of the invention.

Referring first to FIG. 1, tool 100 preferably comprises a plurality of substantially rigid planar panels, each flexibly connected to at least one of the other panels by one of a plurality of hinges.

The plurality of substantially rigid panels include first triangular base panel 102. second triangular base panel 104, first semi-circular side panel 106, second semi-circular side panel 108, third semi-circular side panel 110, and fourth semi-circular side panel 112.

Figure 2:
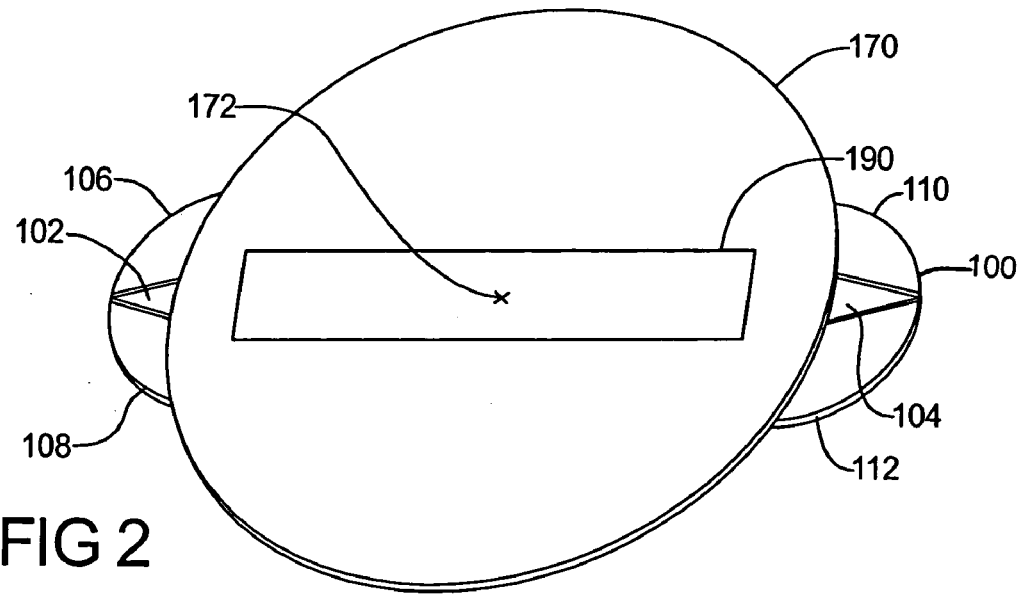
FIG. 2 is a perspective view of the tool of FIG. 1 having placed thereon a still-pliable cookie crepe and fortune ticket.

In the tool's original state or configuration, all of the panels are disposed such that their planar top surfaces lie on a common plane, as depicted in FIGS. 1 and 2.

Figure 4:
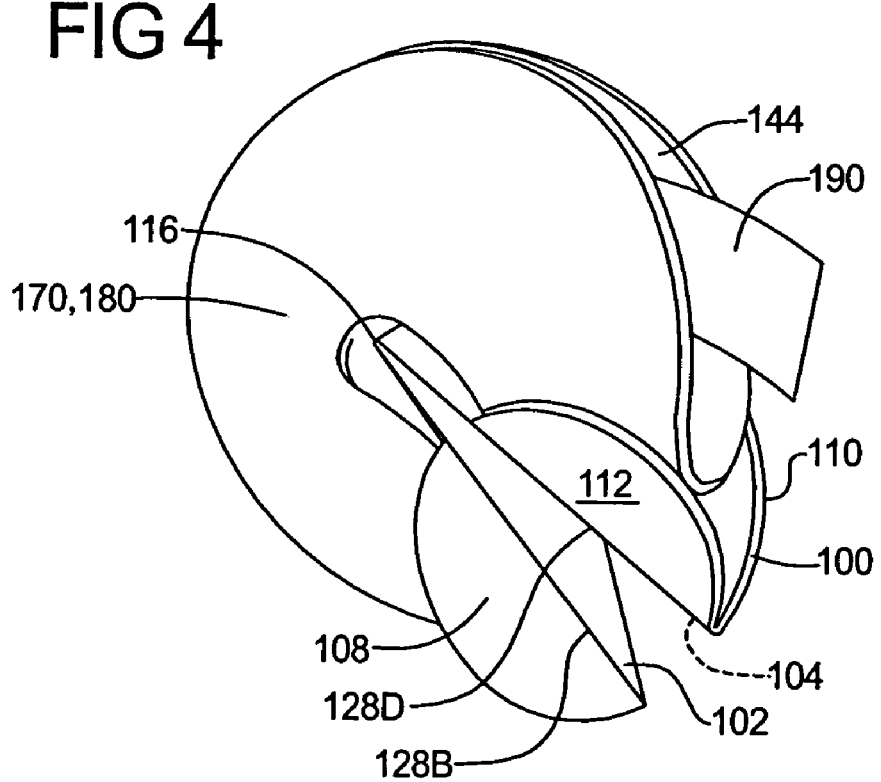
FIG. 4 is a perspective view showing the transverse second folding of the crepe of FIGS. 2 and 3.

In the preferred embodiment, first and second triangular base panels 102 and 104 are identically shaped isosceles triangles having their base side edges collinearly adjoined by first hinge 116 so that said base panels may be flexed relative to each other and below the common plane at least forty-five angular degrees, thereby allowing the top surfaces of the base panels to be flexed downwardly from the original coplanar position to an angle wherein said top surfaces may be separated by at least two-hundred and seventy angular degrees, as depicted in FIG. 4.

Figure 3:
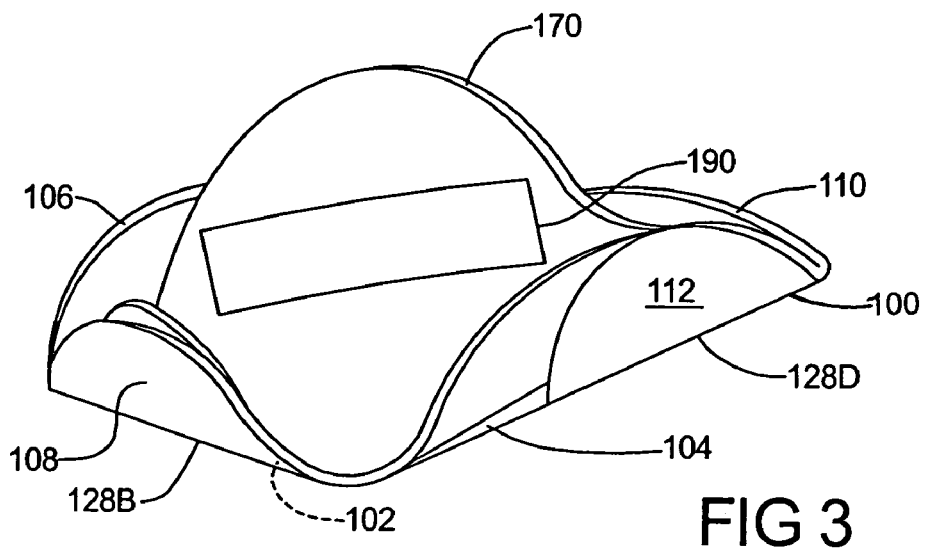
FIG. 3 is a perspective view showing the longitudinal first folding of the crepe of FIG. 2.

Side edges 120, 122, 124, and 126 of side panels 106, 108, 110 and 112 respectively, are each similarly collinearly adjoined by second hinges 128A, 128B, 128C and 128D to base side edges 130, 132, 134, and 136 respectively, so that each of the side panels may be flexed relative to its adjoined base panel and above the common plane at least ninety angular degrees, thereby allowing the top surfaces of the side panels to be flexed upwardly from the original coplanar position to an angle wherein said top surface of each side panel may be separated from the top surface of its adjoined base panel by ninety angular degrees or less, as depicted in FIG. 3.

In the preferred embodiment, panels 102, 104, 106, 108, 110 and 112 are all co-formed of a single sheet of plastic material, such as by molding or stamping. Hinges 116, 128A, 128B, 128C and 128D are preferably "living hinges" formed by molding if the panels are molded, or added to the sheet if the single sheet had been stamped by such common methods as ultrasonic melting, heat-forming, or scoring.

As used herein and intended, a "living hinge" is a flexible hinge feature formed with and to the two a more rigid members that it connects, by making the material thinner or otherwise more flexible along the line of intended flexure, so that the flexibility of the material along that line serve the function of a common hinge, yet this function may be accomplished without additional components. Such living hinges are generally made of plastic and are well-known and commonly employed and will usually survive many flexures without fatiguing and cracking if the material and thickness are properly selected. The preferred plastics used in such hinges are polypropylenes, polyethylenes, or nylon.

In use, a fortune cookie 180 is formed using tool 100 as shown in FIGS. 2 though 4.

Initially, a preferably circular crepe 170 is formed by cooking in a traditional fashion. While still warm the crepe remains soft and pliable, but will set and harden as it cools within a few minutes.

The still-warm and still-pliable crepe is next placed symmetrically onto the common plane lying atop the unfolded tool, as shown in FIG. 2, with the crepe's center-point 172 disposed approximately over the mid point 140 of first hinge 116. This disposition results in portions of the crepe's periphery overlying side panels 106, 108, 110 and 112.

A common fortune ticket 190 may optionally next be placed atop crepe 170, as shown.

The side panels 106, 108, 110 and 112 are next folded upwardly as shown in FIG. 3, about second hinges 128A, 128B, 128C and 128D respectively, preferably by the user pinching panels 106 and 108 between the index finger and thumb of one hand and pinching panels 110 and 112 between the index finger and thumb of the other hand, until the side panels are flexed approximately ninety angular degrees upwardly from their original position, as shown. This action causes the portions of the crepe 170 which had been overlying the side panels to be similarly folded and forms the crepe into a cup-shape which contains fortune ticket 190.

Figure 5:
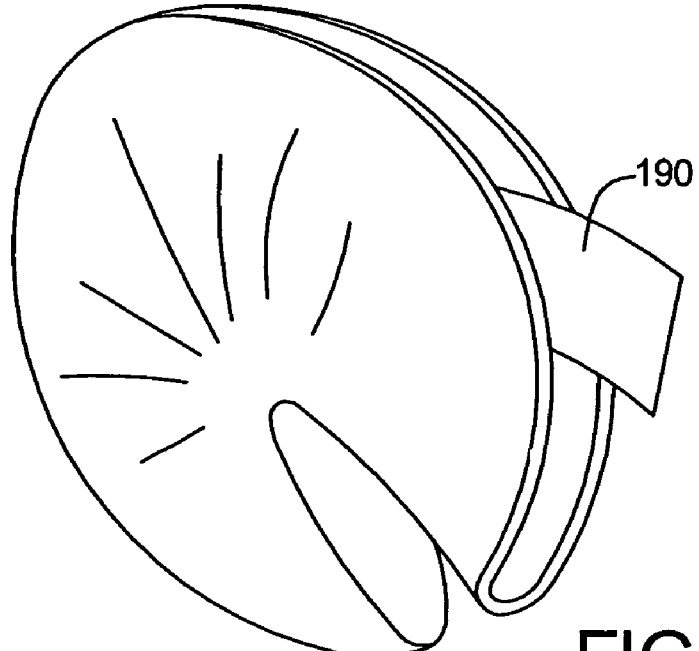
FIG. 5 is a perspective view of a typical fortune cookie having been made using the tool of FIGS. 1 through 6.

Next, with the relationship between the side panels and their adjoined base panels being maintained, base panels 102 and 104 are flexed downwardly about first hinge 116 as shown in FIG. 4, preferably by the user maintaining the pinching of the side panels and twisting his hands at the wrists, until the base panels are approximately two-hundred and seventy degrees apart. The maintenance of the relationship of the side to base panels during this motion ensures that the previously folded portions of the crepe are pulled downwardly with the base panels, thus causing the remainder of the crepe's periphery to collapse inwardly and create a cavity 144 which entraps fortune ticket 190 and which results in the crepe taking the shape of a traditional Chinese fortune cookie 180, which is shown in FIG. 5.

While the specific shape and structure of the tool depicted and described herein represents the preferred embodiment of the invention, it should be understood that there are additional embodiments whish may fall within the spirit of the invention and that the scope of the invention should only be limited according to the following claims.

I claim:

1. A tool for aiding in the forming of a still-pliable cookie crepe into a fortune cookie before the crepe firmly sets and comprising:

a plurality of panels all lying on a common plane during an unfolded configuration for receiving the pliable crepe, said plurality comprising;

a pair of base panels each comprising a base edge and two base panel side edges; said base edges being collinearly disposed and flexibly joined by a first hinge to allow relative movement of said base panels between said unfolded configuration and a folded base configuration wherein said base panels are each pivoted at least ninety angular degrees below said common plane; and four side panels, each comprising a side panel side edge; said side panel side edges each being collinearly disposed and flexibly joined to a different one of said base panel side edges by one of a plurality of second hinges to allow relative movement of each side panel and its adjoined base panel between said unfolded configuration and a folded side panel configuration wherein each side panel is pivoted at least forty-five angular degrees above the plane containing its adjoined base panel.

2. The tool of claim 1 wherein each of said plurality of panels is formed from a thin sheet material.

3. The tool of claim 2 wherein said thin sheet material is a substantially rigid plastic sheet material.

4. The tool of claim 3 wherein said first hinge and said plurality of second hinges are plastic living hinges integrally co-formed with said plurality of panels.

5. The tool of claim 1 wherein all of said panels of said plurality of panels are formed of a single sheet of substantially rigid plastic material and said first hinge and said plurality of second hinges are plastic living hinges integrally co-formed of said single sheet.

* * * * *